May 12, 1970 J. J. TUCCILLO ET AL 3,510,947

INTERCHANGEABLE DENTAL ARTICULATOR

Filed July 19, 1968

INVENTORS
JOSEPH J. TUCCILLO
MICHAEL C. HOWARD

BY Harry Cohn

ATTORNEY

United States Patent Office 3,510,947
Patented May 12, 1970

3,510,947
INTERCHANGEABLE DENTAL ARTICULATOR
Joseph J. Tuccillo, Norwalk, Conn., and Michael C. Howard, North Woodmere, N.Y., assignors to J. T. Jelenko & Co., Inc., New Rochelle, N.Y., a corporation of New York
Filed July 19, 1968, Ser. No. 746,146
Int. Cl. A61c *11/00*
U.S. Cl. 32—32
11 Claims

ABSTRACT OF THE DISCLOSURE

A plurality of spaced rigid studs each tapers outward from a base portion adjacent the surface of a member to a head portion having a diameter larger than that of the base portion. A pair of the members are mounted to permit relative movement simulating that of the jaws and each of the members removably secures a dental model via the studs. Each of the dental models has a surface abutting the surface of the corresponding one of the members when the model is secured to the member. A plurality of bores are formed in each dental model in cooperating relation with the studs of the corresponding one of the members and opening on the surface of the dental model. An annular member is embedded in the dental model adjacent the opening of each bore and has an inner surface tapering outward from the opening of the bore with a minimum diameter and a maximum diameter farthest from the opening and smaller than that of the head portion of each stud. Each annular member comprises a material which is temporarily deformable in a manner whereby the head portion of each stud passes through the corresponding one of the annular members into the corresponding one of the bores and the stud is retained in secured seated position in the bore upon abutment of the surfaces of the corresponding member and dental model.

DESCRIPTION OF THE INVENTION

The present invention relates to a dental articulator. More particularly, the invention relates to an interchangeable dental articulator to which upper and lower dental models may be removably secured and are maintained in constant relative positions.

In dental technology, an articulator is utilized to align the dental models to be duplicated in the same bite and chewing relationship as the original teeth of the patient. The articulator must therefore be movable to simulate the action of the jaws of the patient as closely as possible and the dental models must be positioned on the upper and lower portions of the articulator in a manner whereby they are in the same relationship to each other on the articulator as the patient's teeth.

The models must be secured to the corresponding upper and lower parts of the articulator in predetermined positions which must remain constant during any operations undertaken on the models by the dental technician in order to maintain the relative positions of the upper and lower models during such operations. The models are preferably removably secured to the articulator in order to avoid the necessity for keeping a large number of articulators in the dental laboratory.

The principal object of the present invention is to provide a new and improved interchangeable dental articulator.

An object of the present invention is to provide a dental articulator in which dental models may be positioned and removed without alteration of the relative position of such models.

An object of the present invention is to provide a dental articulator which provides positive and accurate positioning of dental models.

An object of the present invention is to provide a dental articulator on which dental models may be positioned and removed without deterioration of or damage to the dental models or the articulator.

Another object of the present invention is to provide a dental articulator which is of simple structure and which removably secures dental models in desired relative positions with efficiency, effectiveness and reliability.

In accordance with the present invention, a dental articulator comprises a pair of members mounted to permit relative movement simulating that of the jaws. Each of the members has a surface and snap locks for removably securing on the surface a dental model in a desired relation to the other. The snap locks comprise a plurality of spaced substantially rigid studs each tapering outward from a base portion adjacent the surface of the member to a head portion having a diameter larger than that of the base portion. Each of the dental models has a surface abutting the surface of the corresponding one of the members when the dental model is secured to the member. A plurality of bores are formed in the dental model in cooperating relation with the studs of the corresponding one of the members and open on the surface of the dental model. A plurality of annular members are embedded in the dental models. Each of the annular members is adjacent the opening of a corresponding one of the bores and has an inner surface tapering outward from the opening of the bore with a minimum diameter and a maximum diameter farthest from the opening and smaller than that of the head portion of each of the studs. Each of the annular members comprises a material which is temporarily deformable in a manner whereby the head portion of each of the studs passes through the corresponding one of the annular members into the corresponding one of the bores and the stud is retained in secured seated position in the bore upon abutment of the surfaces of the corresponding member and dental model.

Each of the studs is of substantially frusto-conical configuration with a smaller diameter base at its base portion and a larger diameter base at its head portion. The head portion of each of the studs comprises a substantially cylindrical portion coaxially positioned on the larger diameter base of the stud and having the same diameter as the larger diameter base and a substantially conical head coaxially positioned on the cylindrical portion and having a base diameter substantially equal to that of the cylindrical portion. Each of the studs further comprises a collar of substantially cylindrical configuration coaxially positioned on the base portion of the stud and abutting the surface of the corresponding member. The collar has a diameter larger than the maximum diameter of the inner surface of each of the bore. Each of the bores has a surface portion between its annular member and the surface of the corresponding dental model having the same configuration and dimensions as the collar so that the collar of each of the bores is seated in the surface portion of the corresponding bore upon abutment of the surfaces of the corresponding member and dental model.

Each of the members has a plurality of spaced protrusions formed in the surface thereof and each of the dental models has a plurality of depressions formed in the surface thereof in cooperating relation with the protrusions of the corresponding one of the members. Each of the studs has a configuration which is symmetrical about the collar thereof and which is axially symmetrical and the portion of each stud below its collar is embedded in the corresponding member. Each of the studs may comprise a substantially rigid plastic material and each of the annular members may comprise a temporarily deformable plastic material.

The articulator comprises a support structure including a base and an upper part in hinged connection, each having one of the members affixed thereto remote from the hinged connection.

In order that the present invention may be readily carried into effect, it will now be described with reference to the accompanying drawing, wherein.

In the figures, the same components are identified by the same reference numerals.

A dental model is made by first making a wax or similar material impression of the natural teeth of the patient. The impression is mounted on a plate and plaster or artificial stone is slowly poured into the impression with continual vibration to insure that the plaster or stone fills every crevice of the impression and to eliminate air bubbles. The mold is then united with a cast of plaster, artificial stone or any other moldable material suitable for making dental models or casts to form the dental model.

The present invention is applicable to any suitably hinged known dental articulator. A suitable articulator support structure may comprise a base 11 and an upper part 12 (FIG. 1) hinged to each other by any suitable hinge means such as, for example, a pivot pin 13, in a manner which permits relative movement of said base and said upper part to stimulate the movement of the jaws of a patient. The complete adjustment means for the base 11 and the upper part 12 relative to each other is not shown in FIG. 1, because such means, as well as the basic support structure, are well known in the art.

Figure 1:
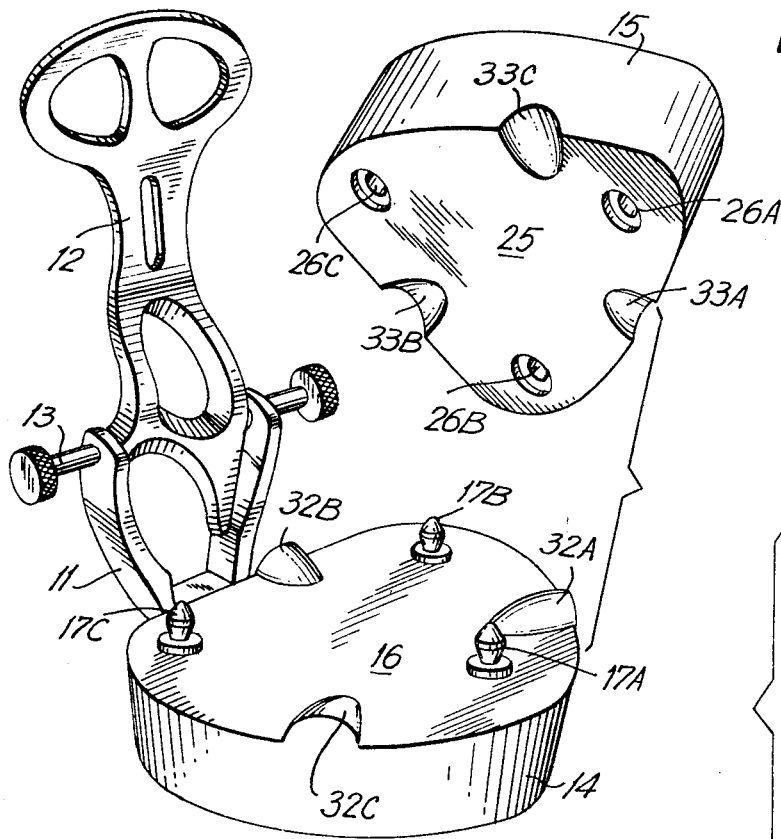
FIG. 1 is a perspective view of an embodiment of the dental articulator of the present invention, showing one of the two members and one of the two dental models in separated positions.

A member 14 is affixed to the base 11 at the end of said base remote from the hinged connection (FIG. 1). A second member, not shown in FIG. 1 to maintain the clarity of illustration, is affixed to the upper part 12 at the end of said upper part remote from the hinged connection (FIG. 1). A dental model 15, which is representative of all or part of a patient's lower gums and teeth, is to be removably secured to a surface 16 of the member 14 in a desired relation to a second dental model. The second dental model, not shown in FIG. 1 to maintain the clarity of illustration, is representative of all or part of the patient's lower gums and teeth and is to be removably secured to a surface of the second member in the desired relation to the dental model 15.

In accordance with the present invention, each of the dental models is removably secured to the corresponding one of the pair of members with facility, rapidity and without damage to the models or the members and each of said models is maintained in position efficiently, effectively and reliably by simple snap fastening or locking means. In order to retain clarity in the disclosure, and in order to fully explain the invention, one dental model 15 and the one corresponding member 14 are disclosed and described, although, as mentioned, there are two such members and two such models. The member and dental model not shown or described are essentially identical with the described member and dental model and function in essentially the identical manner as said described member and dental model.

In accordance with the present invention, the snap locks comprise a plurality of spaced substantially rigid studs 17A, 17B and 17C (FIG. 1) each essentially identical with the others. Any of the studs 17A, 17B and 17C such as, for example, the stud 17A, is disclosed in detail in each of FIGS. 2 and 3. The studs 17A, 17B and 17C are made of any suitably rigid material such as, for example, metal, plastic, or the like.

Each of the studs 17A, 17B and 17C tapers outward from a base portion 18A (FIGS. 2 and 3) and 18B and 18C, respectively, not shown in the figures. The base portion 18A is adjacent the surface 16 of the member 14 (FIG. 3) and the head portion 19A has a diameter larger than that of the base portion 18A.

Figure 2:
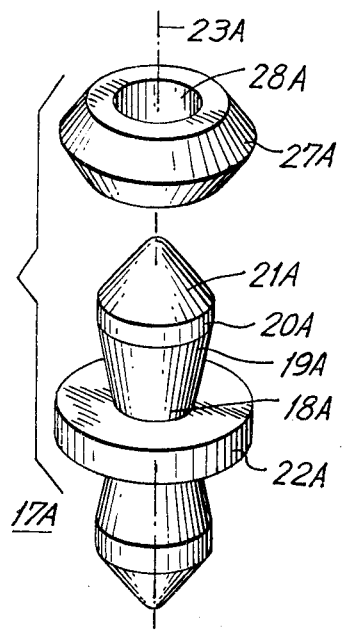
FIG. 2 is a perspective enlarged view of a stud and an annular member of the dental articulator of FIG. 1 in separated positions.
Figure 3:
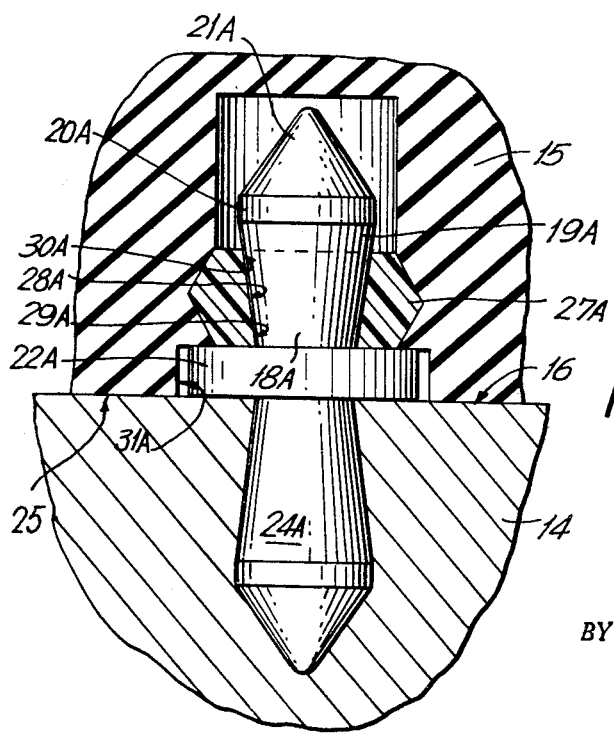
FIG. 3 is a sectional enlarged view of a stud and a corresponding annular member of the dental articulator of FIG. 1 in engaged positions.

Each of the studs 17A, 17B and 17C is preferably of substantially frustoconical configuration with a smaller diameter base at its base portion 18A (FIGS. 2 and 3) and a larger diameter base at head portion 19A (FIGS. 2 and 3). The head portion of each stud, as shown in FIGS. 2 and 3, comprises a substantially cylindrical portion 20A coaxially positioned on the larger diameter base of the stud. The cylindrical portion 20A has the same diameter as the larger diameter base. The head portion of each stud further comprises a substantially conical head 21A coaxially positioned on the cylindrical portion 20A. The head 21A has a base diameter which is substantially equal to the diameter of the cylindrical portion 20A.

Each stud, as shown in FIGS. 2 and 3 further comprises a collar 22A of substantially cylindrical configuration. The collar 22A is coaxially positioned on the base portion 18A of the stud 17A and abuts the surface 16 of the member 14. Each stud has a configuration which is symmetrical about its collar 22A and which is symmetrical about its axis 23A (FIG. 2). The portion 24A of each stud 17A below its collar 22A is firmly embedded in the member 14 (FIG. 3).

The dental model 15 (FIG. 1) has a surface 25 which abuts the surface 16 of the corresponding member 14 when said dental model is secured to said member. A plurality of bores 26A, 26B and 26C (FIG. 1) are formed in the dental model in cooperating relation with the studs 17A, 17B and 17C, respectively, of the member 14. The bores 26A, 26B and 26C open on the surface 25 of the dental model 15.

A plurality of annular members 27A, 27B and 27C are embedded in the dental model 15, of which only the annular member 27A is shown, in FIGS. 2 and 3. Each of the annular members 27A, 27B and 27C is adjacent the opening of a corresponding one of the bores 26A, 26B and 26C, respectively. Each annular member 27A (FIGS. 2 and 3) has an inner surface 28A tapering outward from the opening of the bore. The inner surface 28A has a minimum diameter at its end 29A closer to the opening of the bore 26A and a maximum diameter at its end 30A farthest from said opening and smaller than that of the head portion of the stud 17A.

Each of the annular members 27A, 27B and 27C comprises a material which is temporarily deformable in a manner whereby the head portion of each of the studs 17A, 17B and 17C passes through the corresponding one of the annular members 27A, 27B and 27C into the corresponding ones of the bores 26A, 26B and 26C and each stud is retained in secured seated position in the corresponding bore upon abutment of the surfaces 16 and 25 of the corresponding member 14 and dental model 15.

Each annular member may thus comprise; for example a plastic material which is relatively hard, but which is deformable by the head portion of the stud, so that the inner surface of said annular member, expands temporarily to admit and pass said head portion. After the head portion of the stud passes through the annular member into the bore, said annular member is resilient enough to move or flow back to its initial rest position and snugly contact and hold the stud in position.

When the dental model is to be removed from the member, said dental model and said member are pulled manually apart. The material of the annular member yields and deforms sufficiently to enable the head portion of the stud to pass from the bore through said annular member and out of contact with the dental model. The annular member then moves or flows back to its rest position.

The collar 22A (FIGS. 2 and 3) of each stud 17A has a diameter which is larger than the maximum diameter of the inner surface 28A of each bore 26A. Each of the bores 26A, 26B and 26C has a surface portion 31A (FIG. 3) between its annular member 27A and the surface 25 of the dental model. The surface portion 31A has the same configuration and dimensions as the collar 22A, so that the collar of each of the studs is seated in the surface portion of the corresponding bore, as shown in FIG. 3, upon abutment of the surfaces 16 and 25 of the corresponding member 14 and dental model 15.

The member 14, as does the second member, not shown in the drawing, has a plurality of spaced protrusions 32A, 32B and 32C (FIG. 1) formed in the surface 16 thereof. The dental model 15, as does the second dental model, not shown in the drawing, has a plurality of depressions 33A, 33B and 33C formed in the surface 25 thereof (FIG. 1) in cooperating relation with the protrusions 32A, 32B and 32C, respectively, of the member 14.

In an operating embodiment of the dental articulator of the present invention, the collar 22A had a diameter of ⅝₁₆ inch and an altitude or axial length of ¹⁄₁₆ inch. The cylindrical portion 20A of the head portion had a diameter of .128 inch and an altitude or axial length of .0375 inch. The head 21A of the head portion had a base diameter of .128 inch, an altitude or axial length of .060 inch and a slope from the vertex to the base of 60 degrees. The stud 17A sloped 5 degrees from its larger diameter base to its smaller diameter base and had an axial length or altitude of .122 inch. The overall distance, from vertex to vertex, of the stud 17A was ½ inch and the overall distance from the smaller diameter base to the vertex of the head 21A was ⁷⁄₃₂ inch.

While the invention has been described by means of a specific example and in a specific example, we do not wish to be limited thereto, for obvious modifications will occur to those skilled in the art without departing from the spirit and scope of the invention.

What we claim is:

1. A dental articulator comprising a pair of members mounted to permit relative movement simulating that of the jaws, each of said members having a surface and snap locking means for removably securing on said surface a dental model in a desired relation to the other, said snap locking means comprising a plurality of spaced substantially rigid studs each tapering outward from a base portion adjacent the surface of the member to a head portion having a diameter larger than that of said base portion, each of said dental models having a surface abutting the surface of the corresponding one of said members when said dental model is secured to said member and a plurality of bores formed in said dental model in cooperating relation with the studs of the corresponding one of said members and opening on the surface of said dental model, and a plurality of annular members embedded in said dental models, each of said annular members being adjacent the opening of a corresponding one of said bores and having an inner surface tapering outward from the opening of the bore with a minimum diameter and a maximum diameter farthest from said opening and smaller than that of the head portion of each of said studs, each of said annular members comprising a material which is temporarily deformable in a manner whereby the head portion of each of said studs passes through the corresponding one of said annular members into the corresponding one of said bores and said stud is retained in secured seated position in said bore upon abutment of the surfaces of the corresponding member and dental model.

2. A dental articulator as claimed in claim 1, wherein each of said studs is of substantially frusto-conical configuration with a smaller diameter base at its base portion and a larger diameter base at its head portion and comprises a substantially rigid plastic material, and each of said annular members comprises a temporarily deformable plastic material.

3. A dental articulator as claimed in claim 1, wherein each of said studs is of substantially frusto-conical configuration with a smaller diameter base at its base portion and a larger diameter base at its head portion, the head portion of each of said studs comprising a substantially cylindrical portion coaxially positioned on the larger diameter base of the stud and having the same diameter as said larger diameter base and a substantially conical head coaxially positioned on said cylindrical portion and having a base diameter substantially equal to that of said cylindrical portion.

4. A dental articulator as claimed in claim 1, wherein each of said studs further comprises a collar of substantially cylindrical configuration coaxially positioned on the base portion of the stud and abutting the surface of the corresponding member, said collar having a diameter larger than the maximum diameter of the inner surface of each of said bores, and wherein each of said bores has a surface portion between its annular member and the surface of the corresponding dental model having the same configuration and dimensions as said collar so that the collar of each of the studs is seated in the surface portion of the corresponding bore upon abutment of the surfaces of the corresponding member and dental model.

5. A dental articulator as claimed in claim 1, wherein each of said members has a plurality of spaced protrusions formed in the surface thereof and each of said dental models has a plurality of depressions formed in the surface thereof in cooperating relation with the protrusions of the corresponding one of said members.

6. A dental articulator as claimed in claim 2, wherein said articulator comprises a support structure including a base and an upper part in hinged connection, each having one of said members affixed thereto remote from said hinged connection.

7. A dental articulator as claimed in claim 3, wherein each of said studs further comprises a collar of substantially cylindrical configuration coaxially positioned on the base portion of the stud and abutting the surface of the corresponding member, said collar having a diameter larger than the maximum diameter of the inner surface of each of said bores, and wherein each of said bores has a surface portion between its annular member and the surface of the corresponding dental model having the same configuration and dimensions as said collar so that the collar of each of the studs is seated in the surface portion of the corresponding bore upon abutment of the surfaces of the corresponding member and dental model.

8. A dental articulator as claimed in claim 3, wherein said articulator comprises a support structure including a base and an upper part in hinged connection, each having one of said members affixed thereto remote from said hinged connection, each of said studs further comprises a collar of substantially cylindrical configuration coaxially positioned on the base portion of the stud and abutting the surface of the corresponding member, said collar having a diameter larger than the maximum diameter of the inner surface of each of said bores, and wherein each of said bores has a surface portion between its annular member and the surface of the corresponding dental model having the same configuration and dimensions as said collar so that the collar of each of the studs is seated in the surface portion of the corresponding bore upon abutment of the surfaces of the corresponding member and dental model, and each of said members has a plurality of spaced protrusions formed in the surface thereof and each of said dental models has a plurality of depressions formed in the surface thereof in cooperating relation with the protrusions of the corresponding one of said members.

9. A dental articulator as claimed in claim 4, wherein each of said studs has a configuration which is symmetrical about the collar thereof and which is axially symmetrical and the portion of each stud below its collar is embedded in the corresponding member.

10. A dental articulator as claimed in claim 8, wherein each of said studs comprises a substantially rigid plastic material and each of said annular members comprises a temporarily deformable plastic material.

11. A dental articulator as claimed in claim 9, wherein each of said studs comprises a substantially rigid plastic material and each of said annular members comprises a temporarily deformable plastic material.

References Cited

UNITED STATES PATENTS

| | | | |
|---|---|---|---|
| 3,123,914 | 3/1964 | De Piefro | 32—32 |
| 3,414,977 | 12/1968 | Cayo | 32—32 |

ROBERT PESHOCK, Primary Examiner